INVENTOR.
GEORGE C. CHRISTIAN

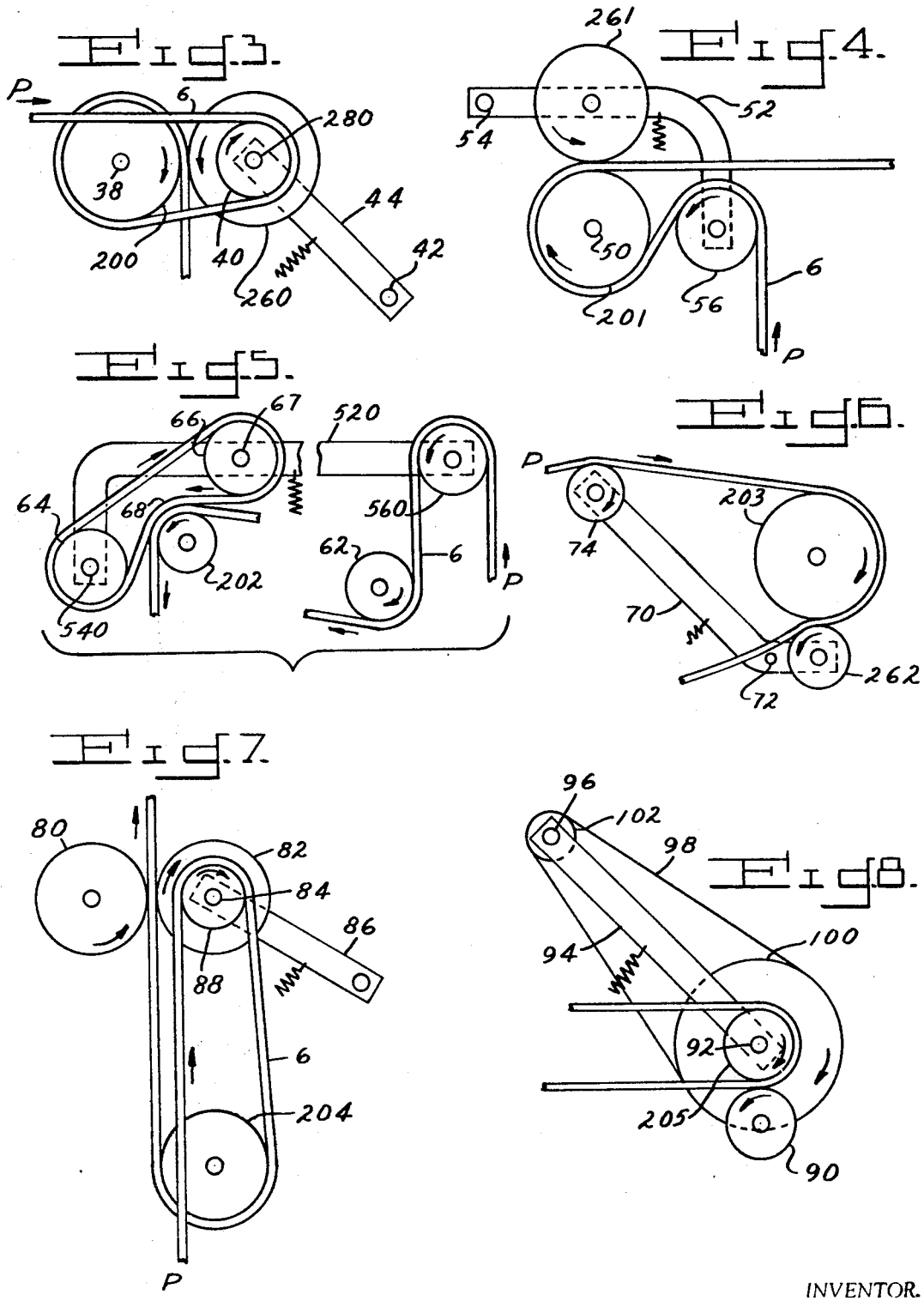

3,608,389
LOAD RESPONSIVE GRIPPING DEVICE FOR
FLEXIBLE CABLE DRIVES AND THE LIKE
George C. Christian, 8 Grinnell St.,
Greenfield, Mass. 01301
Filed Dec. 5, 1969, Ser. No. 882,477
Int. Cl. F16h 7/08, 7/10, 7/12
U.S. Cl. 74—242.9                                    7 Claims

ABSTRACT OF THE DISCLOSURE

A device for driving a flexible cable, rope, belt, or the like, and gripping the same with a presssure proportionally related to the pulling force of the load imposed thereon, having a rotatable driving pulley and rotatable pressure applying roller, the pulley and roller being mounted for relative positional shifting movement, and, a lever engageable by the cable and responsive to the load of the pulling force thereon to cause the pressure roller to bear against the cable with a force proportionally related to the pulling load. The device may be used, for example, as a simplified and efficient driving means for a portable rope ski tow.

BACKGROUND

This invention relates to an apparatus for hauling, hoisting, or otherwise driving a load imposed on a relatively long or endless flexible member such as a rope, cable, belt or the like. It is particularly related to conventional power transmitting pulleys for driving such flexible members and provides a simplified pressure roller means for gripping the cable member with a force proportional to and variable with the pulling force of the load on the cable and for the purpose of obtaining a maximum degree of controlled power transmission in a more efficient manner than that obtained with prior devices such as the common types of winch, windlass, capstan or other drum winding mechanisms.

Heretofore, insofar as I am aware, there has been no simple, direct way of positively securing a cable on a driving pulley with a frictional localized gripping contact to drive the cable with a degree of pressure proportionally related to the weight of said load and so as to prevent slippage under varying load conditions without undue wear on the cable.

The present device is designed to eliminate the need for the many and various tensioning devices as are commonly used in the application of power transmitting cable or belt and pulley mechanisms. Multiple windings and external tensioning weights or spring-arrangements are eliminated. Maximum efficiency is thus obtained in the operation of the power source for driving the pulley. The device is self-adjusting according to the load imposed and serves to prevent wear and tear on the cable element thereby increasing its useful life. An example of the application of the device may be appreciated in one of its simplest forms as a drive mechanism for a portable rope ski tow.

SUMMARY

The invention may be practiced by arranging the essential elements of the drive in a variety of different forms. In one of the more elementary embodiments a motor-powered driving pulley for pulling a cable is supplied with a pressure roller which is mounted on a lever arm pivoted to shift the roller against the cable and thus grip the same against slipping on the driving pulley. The magnitude of the presssure may be designed into the lever, as will become apparent, and the pressure force will be directly controlled by the load force placed on the cable by reason of its being looped around a lever actuator at the free end of the lever. The load thus pulls the roller against the cable with a force directly and proportionally related to its weight.

The advantages and features of the invention will be apparent from the following description of illustrative examples thereof as shown by the accompanying drawings, in which FIG. 1 is a top plan view of the essential elements of a device embodying the invention and shown assembled in somewhat schematic form;

FIG. 3 is a line drawing diagrammatically illustrating a variation in the operation of the device of FIGS. 1 and 2;

FIGS. 4 and 5 are similar line drawings showing optional variations as applied to an alternative form of device embodying the invention;

FIG. 6 is a line drawing showing a further alternative form;

FIG. 7 is a similar line drawing showing an embodiment of the invention using a presssure roller for gripping the cable at a location remote from the driving pulley; and FIG. 8 is a similar illustration of a device in which the motor driving pulley may be pivotally mounted in contrast to the stationary mounting thereof as shown in the remaining examples.

Figure 1:
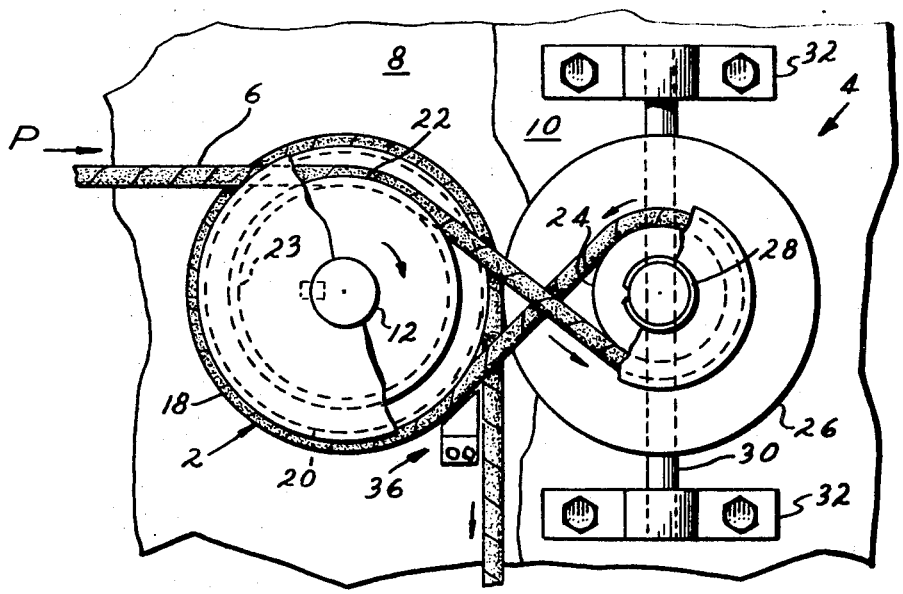
Figure 2:
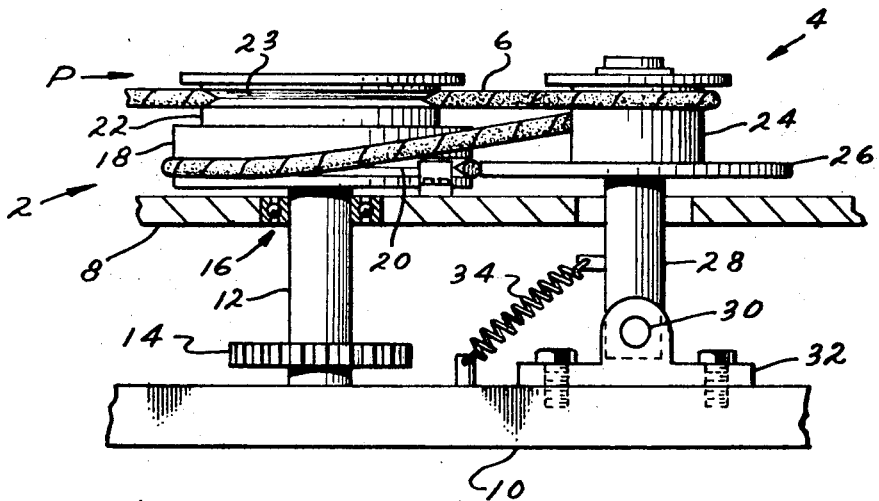
FIG. 2 is a side elevational view of the parts of the device as shown by FIG. 1.

One form of a device embodying the present invention is shown by FIGS. 1 and 2 in a more or less schematic form. The essential elements comprise a relatively shiftable driving pulley 2 and pressure roller 4, the latter being pivoted to apply a gripping pressure against a cable or rope 6 wound in driving engagement around the pulley 2 and in such a way that the grip is directly related to the load placed on the cable 6. The letter P indicates that end of the rope carrying a load, variable or otherwise, and the arrow designates the direction of travel against the pulling forces of such a load. Portions only of supporting framework for a completely operative assembly are shown on different levels at 8 and 10, it being readily understood that a shaft 12 to which the pulley 2 is keyed may be rotated through a gear 14 having a drive connection from a suitable motor as a power source (not shown).

Shaft 12 is shown extending through a bearing 16 in frame piece 8, the pulley 2 in this form of the device having a lower driving drum 18 provided with a V-shaped groove 20 around which the cable being driven is looped. Pulley 2 is also provided with an upper drum 22 of reduced diameter for guiding the incoming cable in a V-groove 23 as will be described.

Mounted in adjacent relation to the shaft 12 and pulley 2 is the pivoted pressure applying roller 4, this latter member having an upper cable receiving drum section 24 and a pressure applying disk or roller 26 for engaging and applying pressure against cable 6 in groove 20 in advance of the area where cable 6 leaves the drum 18. Drum 24 and pressure roller 26 are rotatably mounted on the upper end of a lever arm as a spindle post 28 extending through a slotted portion of the frame section 8, the post at its lower end being suitably fixed as by a key or pin connection (not shown) to a cross pivot bar 30. Bar 30 is pivotably mounted with its ends rotatable in blocks 32 fixed on frame section 10. The spindle shaft 28 is urged by a spring 34 in a direction to engage roller 26 against a cable 6 wound around drum 18, one end of the spring being fastened to the pivot post 28 and the other being anchored on frame section 10 as shown. The desired spring pressure, under conditions where no load is being imposed on the driven cable, is preferably only that sufficient to cause pressure roller 26 to bear lightly against cable 6 lying in groove 20. Thus the action of the roller 26 is at all times immediately available to grip the cable to the desired degree as soon as any load is imposed.

The cable 6 in entering the device, as from the left in FIGS. 1 and 2 is first engaged by groove 23 of the upper drum 22. This engagement is primarily for the purpose of positionally guiding the cable in order to direct it in criss-cross relation between the members 2 and 4 and towards the lower side (FIG. 1) of rotatable drum 24. Thus the cable when wrapped around drum 24 and looped back toward member 4 will circumferentially engage drum 24 to an appreciable degree. It may be noted that in various uses of the device, as for example in a ski rope tow drive the load may be applied at some distance from the unit and thus be subject to forces which may often times prevent a load from being pulled in a true straight line direction. The drum 22 thus serves to control and maintain the illustrated looped condition of cable 6 on drum 24.

After being looped around drum 24 in a counter-clockwise direction, the cable passes diagonally underneath the portion leading to drum 24 and engages groove 20 of the lower driving pulley portion 18 where it is wound in a clockwise direction around the pulley. As shown, after nearly a full turn around pulley 2 the cable is engaged by pressure roller 26 and shortly beyond the point of engagement is led out of the device. It will be readily understood that unless otherwise tensioned by pulling forces at its exit end the cable will be more or less slack. Thus a block, as indicated at 36, may be positioned to strip the cable from the groove and insure proper separation from the pulley. It may also be noted that consistent with the purpose of the device in pulling a load the slack cable may be appropriately stored on a reel, be returned to its source as in an endless cable, or otherwise disposed of. As used for a ski rope tow operation appropriate guiding pulleys would be utilized as needed to return the cable to a down-hill location for a person to grasp at a loading station.

It will be apparent from the above description of the device of FIGS. 1 and 2 that a pulling force or load imposed on the leadin portion of cable 6 will cause member 4 to be drawn towards the driving pulley 2 and the pressure roller member 26 to grip cable 6 in groove 20 by applying an amount of pressure directly proportional to such pulling force. The length of the lever arm, or post 28, and the mechanical advantage of a particular shape of groove, as the V-groove 20, may also be taken into account so that a desired gripping force may be readily designed into this type of device and be advantageously used for various load carrying purposes.

While a device comprising the elements operating as described in connection with FIGS. 1 and 2 has proven in actual practice to have the advantages as above set forth, it will be understood that the basic principle of the relatively shiftable or movable driving pulley and pressure members for gripping the cable, belt or the like may be incorporated in various modifications and alternative arrangements. In FIGS. 3–8 inclusive, there is shown a variety of such arrangements, each being diagrammatically illustrated by line drawing representations in an end of shaft viewing of the driving pulley, pressure roller, and pivoted lever arm.

In the FIG. 3 representation of the elements of the device, the operation is basically similar to that of FIGS. 1 and 2. In this form, however, the upper cable positioning guide drum (i.e. drum 22) is omitted, the cable driving pulley 200 only being shown as mounted on a drive shaft at 38. Cable 6 in this modification leads directly to the pivotally mounted pressure roller assembly with a rotatable pressure roller 260 for engaging cable 6 on pulley 200. In this assembly the cable is wound directly on an upper drum 40 for clockwise rotation, the drum 40 being mounted on a shaft 280 independently of the pressure roller 260 which is mounted for counter-clockwise rotation on the same shaft as indicated by the arrows. Shaft 280 is carried on the free end of a pivot arm as lever 44 which is pivoted at 42 and spring urged in the direction of pulley 200. This form as will be readily seen will operate in essentially the same fashion as the device of FIGS. 1 and 2 and will be equally effective when the load force is pulled in a true straight line direction.

The arrangement represented in FIG. 4 diagrammatically illustrates the elements of the invention in perhaps the simplest form. Here a driving pulley is at 201 on a drive shaft 50. Located above pulley 201 is a right angled lever 52 pivoted at 54 and carrying a pressure roller 261 in a position to engage cable 6 looped around pulley 201. At its outer angled end the lever carries an actuator roll 56 adjacent pulley 201 for engagement by the load carrying end of cable 6. Cable 6 as shown passes over actuator 56 and is wound upwardly around pulley 201. It will readily be seen that the load imposed on cable 6 will result in a directly proportional gripping pressure of roller 261 against cable 6. The released end of cable 6 as above mentioned may be appropriately stored on a reel or otherwise suitably guided away from the device.

A device as illustrated by FIG. 5 is operated essentially as that shown by FIG. 4 and represents a variation thereof. The driving pulley is at 202 and rotates in counter-clockwise direction. An angled long lever arm 520 is pivoted at 540 on an axis in offset lower relationship to the axis of pulley 202. At the outer end of the long arm of the lever and at the other side of pulley 202 is an actuator roll 560. The loaded end of cable 6 is first looped over actuator 560; is passed downwardly around a fixed guide roll 62 located in offset relation below pulley 202; and then brought upwardly around the latter. A roller 64 is mounted on the axis of the pivot 540 of the lever and a second roller 66 is mounted on the long arm of the lever 520 on an axis at 67. A line between the axes of the rollers 64 and 66 lies in generally tangential relation to the driving pulley 202. An endless belt 68 is carried by rollers 64 and 66 and thus bears against a cable on the pulley. As will be evident from the arcuate contact shown the endless belt permits a gripping pressure to be distributed on the cable 6 over a larger localized surface, this greater surface distribution being of advantage in cases where a point contact by the pressure rollers previously described may exceed the crushing strength of a particular rope or cable due to greatly increased lever arm length.

In FIG. 6 a still further modification is shown. Here the drive pulley is at 203, the lever system being formed as a bell crank 70 pivoted at 72. A pressure roller is located on the short arm at 262 and an actuator roll 74 is mounted on the tip of the long arm. As will be seen a pulling force imposed on the cable will rock lever 70 by exerting downward pressure on the actuator roll 74 and thus increasing the pressure of roller 262 against the cable wound on the drive pulley 203.

In FIG. 7 the driving pulley is at 204 and the pressure gripping means is remote from this element. A pressure roller at 80 is stationary. A pivoted pressure roller is at 82 on a shaft 84 of a pivoted lever 86. Also rotatable on shaft 84 and in a direction counter to that of the pivoted pressure roller 82 is an actuator drum 88. As shown the load carrying end of a cable 6 is first looped around the actuator 88, then around the driving pulley 204 to be directed upwardly between rollers 80 and 82. The pulling force of a load driven by the cable will shift roller 82 and press it against the stationary roller 80 with a force directly proportional to such load.

In the representation of the alternative form of the invention shown by FIG. 8, a driving pulley 205 is seen in an arrangement wherein it is moved relative to a stationary pressure roller 90 for applying a proportional gripping force. The driving pulley 205 is carried on a shaft 92 mounted at the end of a lever arm 94 pivoted on a motor shaft 96. Shaft 92 of the pulley 205 is driven as by a drive chain 98 driving sprocket 100 from sprocket 102 on the motor shaft 96 on which lever 94 is pivoted.

What is claimed is:

1. A device for driving flexible cable members and the like comprising:
   a rotatable driver element engageable by a flexible member for driving the latter,
   a presser element for applying a gripping force in contact with the flexible member at the exit side of said driver element,
   said driver and presser elements being positionally movable towards and away from each other, and
   means engageable by the flexible member in advance of driving contact with said driver element and responsive to the pulling force of a load placed on said flexible member for urging said driver and presser elements towards each other and engaging the flexible member between them at said exit side of the driver element with a gripping pressure proportionally related to said pulling force.

2. The device of claim 1 in which the driver element is mounted in a stationary position.

3. The device of claim 2 in which said load responsive means includes a pivoted lever arm and said presser element is mounted on said arm for exerting pressure against the flexible member.

4. The device of claim 3 in which said lever arm also carriers an actuator at an outer end thereof for said engagement by the flexible member prior to engaging said driver element.

5. The device of claim 4 in which said actuator is freely pivoted on the outer end of said lever arm, said arm is lightly spring urged in the direction of said driver element and said presser element is rotatably mounted on the same end of the lever arm.

6. The device of claim 4 in which said driver element is a grooved driving pulley and said presser element is a disk rotatably mounted on said lever arm.

7. The device of claim 6 in which:
   said driving pulley is carried on a drive shaft on which a cable guide drum is mounted outwardly of the pulley,
   said lever arm is a pivoted post and said disk is mounted for rotation about the axis of the post, the engagement of a cable between the driving pulley and said disk disposing said pivoted post in substantially parallel relation to said pulley drive shaft, and
   said actuator is a drum disposed outwardly of the disk on the axis thereof,
   whereby a cable being driven by said device may first engage the side of said cable guide drum for positioning the cable to wrap the same around said actuator drum in criss cross fashion prior to winding it around said driving pulley.

References Cited

UNITED STATES PATENTS

| | | | |
|---|---|---|---|
| 782,978 | 2/1905 | Magruder | 74—227 |
| 812,899 | 2/1906 | Thacher | 74—242.9 |
| 2,696,678 | 12/1954 | Deck et al. | 74—242.11X |
| 2,775,137 | 12/1956 | Chung | 74—242.9X |

LEONARD H. GERIN, Primary Examiner

U.S. Cl. X.R.

74—224, 227, 242.11, 242.15